(12) United States Patent
Leinweber et al.

(10) Patent No.: US 11,845,892 B2
(45) Date of Patent: Dec. 19, 2023

(54) USE OF COMPLEX POLYESTERAMINES AND POLYESTER POLYQUATERNARY AMMONIUM COMPOUNDS AS CORROSION INHIBITORS

(71) Applicant: Clariant International, Ltd., Muttenz (CH)

(72) Inventors: Dirk Leinweber, Kelkheim (DE); Tobias Platen, Hochheim am Main (DE); Nihal N. Obeyesekere, Houston, TX (US); Matthias Krull, Harxheim (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 17/395,107

(22) Filed: Aug. 5, 2021

(65) Prior Publication Data

US 2023/0102819 A1    Mar. 30, 2023

(51) Int. Cl.
  *C23F 11/00* (2006.01)
  *C09K 8/54* (2006.01)
  *C08G 63/685* (2006.01)

(52) U.S. Cl.
  CPC ............ *C09K 8/54* (2013.01); *C08G 63/6856* (2013.01); *C09K 2208/32* (2013.01)

(58) Field of Classification Search
  CPC .. C09K 8/54; C09K 2208/32; C08G 63/6856; C23C 22/00
  USPC ...................................................... 422/7, 14
  See application file for complete search history.

(56) References Cited

U.S. PATENT DOCUMENTS

| 5,034,444 A | 7/1991 | Yun |
| 5,178,786 A | 1/1993 | Jahnke |
| 5,352,377 A | 10/1994 | Blain |
| 5,456,731 A | 10/1995 | Blain |
| 5,710,110 A | 1/1998 | Cooperman |
| 2013/0274492 A1* | 10/2013 | Hellberg ................. C23F 11/14 554/107 |
| 2020/0360938 A1 | 11/2020 | Arndt |

FOREIGN PATENT DOCUMENTS

| EP | 0572881 A1 | 12/1993 | |
| WO | 9406895 A1 | 3/1994 | |
| WO | WO-2004073617 A2 * | 9/2004 | ........... A61K 31/765 |
| WO | 2011000895 A1 | 1/2011 | |
| WO | 2012028542 A1 | 3/2012 | |
| WO | WO-2013092440 A1 * | 6/2013 | ............... C09K 8/52 |
| WO | 2019141343 A1 | 7/2019 | |

OTHER PUBLICATIONS

Extended European Search Report issued in App. No. EP21209864, dated May 11, 2022, 5 pages.

* cited by examiner

*Primary Examiner* — Monzer R Chorbaji
(74) *Attorney, Agent, or Firm* — Natali Richter

(57) ABSTRACT

Use of complex polyester amines and polyester quaternary ammonium compounds as corrosion inhibitors for metal surfaces, and a method for protecting a metal surface from corrosion by contacting the metal surface with said corrosion inhibitor.

20 Claims, No Drawings

USE OF COMPLEX POLYESTERAMINES AND POLYESTER POLYQUATERNARY AMMONIUM COMPOUNDS AS CORROSION INHIBITORS

The present invention relates to the use of complex polyester amines and polyester quaternary ammonium compounds as corrosion inhibitors for metal surfaces, and to a method for protecting a metal surface from corrosion by contacting the metal surface with said corrosion inhibitor.

Corrosion is often a serious and challenging issue in oil and gas field processes, e.g., in transportation and storage of crude oil, and in oil or gas wells. Water, acidic gases such as hydrogen sulfide and carbon dioxide, organic acids, and oxygen contribute to the corrosion of mild steel and other types of alloys. This endangers the integrity of equipment and may cause oil and gas to leak from flowlines which can lead to explosions, accidents, and environmental disasters. Corrosion inhibitors are essential for securing the integrity of flowlines used e.g., in the oil and gas industry and for preventing uncontrolled discharge of oil and/or gas into the environments surrounding the flowlines.

In oil and gas field operations there are various causes for corrosion. Dissolved gases such as carbon dioxide or hydrogen sulfide may cause so-called sweet and sour corrosion, respectively, on ferrous metal surfaces. Another serious source of corrosion is a high electrolyte concentration in the water which is co-produced with the oil and gas. Further severe risks of corrosion are obvious when inorganic or organic acids are used in so-called acid stimulation or fracturing operations encountered in order to increase the productivity of oil and gas wells. Also, in drilling operations there often is a need to use corrosion inhibitors, e.g., in drilling fluids. Often corrosion problems are also an issue in downstream processes as for example in refineries, when crude oils containing salts and/or acidic components are being processed.

A frequently applied countermeasure against corrosion is the use of chemical additives. Corrosion inhibitors are either water-soluble or oil soluble chemical compounds. When added in small quantities to an aggressive medium, these chemicals inhibit corrosion by changing the surface conditions of the metal. Often corrosion inhibitors attach to the metallic surface and form a hydrophobic film which prevents the corrosive species to get into contact with the metal. Well-known bases for corrosion inhibitor formulations useable in various kinds of systems are different types of nitrogen-containing compounds, such as e.g., fatty amines, alkoxylated fatty amines, amidoamines, quaternary ammonium compounds and nitrogen containing esters.

U.S. Pat. No. 5,178,786 discloses corrosion-inhibiting compositions and their use in functional fluids, especially in aqueous hydraulic fluids. These compositions comprise at least four components A, B, C, and D, wherein component D is an ester-salt formed by the reaction of an alkyl or alkenyl succinic anhydride with an alkanolamine under conditions that lead to an ester group. The preferred alkanolamines are, dimethylethanolamine, diethylethanolamine, and methylethylethanolamine, and thus the preferred products D are not polymers.

U.S. Pat. Nos. 5,352,377 and 5,456,731 disclose reaction products of hydrocarbyl-substituted carboxylic anhydrides, more specifically hydrocarbyl substituted succinic anhydrides, and aminoalkanols, e.g., ethoxylated fatty alkyl monoamines or ethoxylated fatty alkyl propylenediamines, that can provide effective antiwear, antirust, and corrosion-inhibiting properties in lubricant and fuel applications.

Besides these monomeric additives, a number of oligomeric respectively polymeric nitrogen-containing compounds have been described wherein the monomers are linked by ester groups. They are used in various applications and for different purposes. Being based on dicarboxylic acids (or their anhydrides) and ethoxylated (fatty alkyl) amines these oligomeric compounds have a linear structure.

For example, EP 0572881 discloses a product obtained from an oxyalkylated primary fatty amine and a dicarboxylic acid and its use in a process for separation of a petroleum emulsion of the water-in-oil type.

WO 94/06895 discloses oligomers/polymers, which can be prepared by polymerizing an anhydride, e.g., phthalic anhydride, and diols based on long-chain amines, e.g., ethoxylated octadecylamine. These products are used as additives to improve the low-temperature properties of distillate fuels.

U.S. Pat. No. 5,034,444 discloses a rheological additive for non-aqueous coating compositions containing a reaction product of an alkoxylated aliphatic amino compound and an organic polycarboxylic anhydride or acid. Besides the exemplified maleic anhydride and its mixture with phthalic acid some higher carboxylic acids and their anhydrides as for example the tetracarboxylic acids and acid anhydrides pyromellitic dianhydride, biphenyltetracarboxylic dianhydride, benzophenone-tetracarboxylic dianhydride and 5-(2, 5-dioxotetrahydrofuryl)-3-methyl-3-cyclohexene-1,2-dicarboxylic anhydride are mentioned. U.S. Pat. No. 5,710,110 discloses similar reaction products as a component in a drilling fluid composition.

WO 2011/000895 discloses oligomeric and polymeric reaction products obtainable by the reaction of an alkoxylated fatty amine having two or more hydroxyl groups with a dicarboxylic acid derivative, optionally quaternized and their use for corrosion inhibition. The exemplified oligomeric reaction products are synthesized with a 20 mol-% surplus of acid in respect to hydroxyl groups. They are reported to give corrosion protection at much lower dosage rates than a standard inhibitor.

WO 2012/028542 discloses the use of a polyesteramine or a polyester polyquaternary ammonium compound being the reaction product of a dicarboxylic acid or its reactive equivalent with a fatty acid and an alkanolamine having two or three hydroxyl groups as a corrosion inhibitor for metal surfaces.

WO 2019/141343 discloses esterquats obtainable by condensation of a di- or trialkanol amine with a mixture of fatty acids and polycarboxylic acids and subsequent quaternization. The molar ratio between fatty acid and polycarboxylic acid is from 1:10 to 10:1 with a surplus of the fatty acid being particularly preferred. The esterquats are used as a collector in the flotation of minerals and ores.

Accordingly, a variety of corrosion inhibitors have been developed and have successfully been used in the presence of freshwater, seawater, or brine. However, there is an ongoing need for more effective corrosion inhibitors and especially for water-soluble corrosion inhibitors. This is especially valid for high temperature applications. Further, the corrosion inhibitor shall be effective in sweet as well as in sour environments in batch treatment, and also in applications in very high shear environments as for example in environments where shear stress of 10 Pa or more, often 20 Pa and more sometimes even above 50 Pa prevails. With other words, there is a need for corrosion inhibitors being effective independently from the shear stress occurring in the treated fluid. There is especially a need for more effective corrosion inhibitors which fulfil stringent regulatory requirements for environmental adaptation, especially a reduced toxicity, an acceptable biodegradation profile combined with a low tendency to bioaccumulation. Furthermore, there is a need for corrosion inhibitors which can be made from renewable raw materials in order to reduce the carbon footprint of such products.

Surprisingly it has been found that a branched polyester polyamine obtainable by the condensation of a polycarboxylic acid having three or four carboxylic acid groups or a derivative thereof and a fatty acid with an alkanolamine having two or three hydroxyl groups as well as its quaternized polyester quaternary ammonium compound, wherein said condensation product has been quaternized by a suitable alkylating agent, provides excellent corrosion-inhibiting properties. Said polyester polyamine and especially said polyester quaternary ammonium compound have high water solubility. Both have advantageous environmental properties as for example excellent biodegradability and low fish acute toxicity. The tri-respectively tetracarboxylic acids form oligomers with a branched structure which differs significantly from the linear structures formed by dicarboxylic acids. Without wishing to be bound to this theory, it is believed that the branched structure of the polyester induced by the polycarboxylic acid having three or four carboxylic acid groups provides a more efficient coverage of the metal surface to be protected and thereby gives a superior protection against corrosion. Surprisingly, and in contrast to many other corrosion inhibitors, said polyester polyamine and polyester quaternary ammonium compounds do not cause foaming issues.

Thus, in a first aspect of the invention there is provided the use of a branched polyester selected from the group consisting of
i) a branched polyester polyamine formed by reaction of
A) a polycarboxylic acid having 3 or 4 carboxylic acid groups, or a reactive derivative thereof, with
B) a monocarboxylic acid having the formula (I)

$$R^1COOH \quad (I)$$ 

wherein $R^1$ is an alkyl or alkenyl group having from 6 to 28 carbon atoms, or a reactive derivative thereof, and
C) an alkanolamine having the formula (II)

wherein
$R^2$ is a straight or branched chain alkyl residue having from 1 to 24 carbon atoms, an alkenyl residue having from 2 to 24 carbon atoms or a polyoxyalkylene residue of the formula $—(D-O)_z-R^3$;
$R^3$ is hydrogen, an alkyl group having 1 to 18 carbon atoms or an acyl group having 2 to 18 carbon atoms;
A, B, D independently from each other are a $C_2$ - to $C_4$-alkylene group or a mixture of those; and
x, y, z independently from each other are integers from 1 to 20;
ii) a branched polyester quaternary ammonium compound obtainable by quaternization of the branched polyester polyamine (i); and
iii) a mixture of branched polyester polyamine (i) and branched polyester quaternary ammonium compound (ii)
as a corrosion inhibitor.

In a second aspect of the invention there is provided a method for protecting a metal surface from corrosion, the method comprising a step of bringing the metal into contact with an effective amount of a branched polyester selected from the group consisting of
i) a branched polyester polyamine formed by reaction of
A) a polycarboxylic acid having 3 or 4 carboxylic acid groups, or a derivative thereof, with
B) a monocarboxylic acid having the formula (I)

$$R^1COOH \quad (I)$$ 

wherein $R^1$ is an alkyl or alkenyl group having from 6 to 28 carbon atoms, or a derivative thereof, and
C) an alkanolamine having the formula (II)

wherein
$R^2$ is a straight or branched chain alkyl residue having from 1 to 24 carbon atoms, an alkenyl residue having from 2 to 24 carbon atoms or a polyoxyalkylene residue of the formula $—(D-O)_z-R^3$;
$R^3$ is hydrogen, an alkyl group having 1 to 18 carbon atoms or an acyl group having 2 to 18 carbon atoms;
A, B, D independently from each other are a $C_2$ - to $C_4$-alkylene group or a mixture of those; and
x, y, z independently from each other are integers from 1 to 20;
ii) a branched polyester quaternary ammonium compound obtainable by quaternization of the branched polyester polyamine (i); and
iii) a mixture of branched polyester polyamine (i) and branched polyester quaternary ammonium compound (ii).

These and other aspects of the present invention will be apparent from the following detailed description of the invention.

In the context of this patent application the term "polycarboxylic acid" means carboxylic acids having three or four carboxylic acid groups in the molecule.

Preferably, the polycarboxylic acid having 3 or 4 carboxylic acid groups has the formula (III)

wherein
Y is an optionally substituted aliphatic group having from 2 to 15 carbon atoms, an aliphatic aminoalkyl group having from 3 to 12 carbon atoms and from 1 to 3 nitrogen atoms, or an optionally substituted aromatic group having from 6 to 18 carbon atoms, and
X is hydrogen, a $C_1$ - to $C_{20}$-alkyl group, a carboxylic acid group or a carboxylic acid derivative, a keto group, —OH or —OR$^4$, wherein $R^4$ is a $C_1$-$C_4$ alkyl group.

In a preferred embodiment, the aliphatic group Y having 2 to 15 carbon atoms is an alkylene or alkenylene radical. More preferably, Y is an alkylene or alkenylene radical having from 2 to 10, more preferably from 3 to 6 carbon atoms, as for example from 2 to 15, or from 2 to 6, or from 3 to 15, or from 3 to 10 carbon atoms, and especially preferred having 2, 3 or 4 carbon atoms. Preferred alkenylene radicals Y contain one or two double and/or triple bonds. In a preferred embodiment, the carboxyl groups are bound to different carbon atoms of the alk(en)ylene radical. In a further preferred embodiment, two carboxyl groups are bound to the same carbon atom of the alk(en)ylene radical. However, each carbon atom of the alk(en)ylene radical bears at most two carboxylic acid groups.

In a further preferred embodiment, Y is an alkylene radical containing one or more nitrogen atoms. More preferably, Y is an alkylene radical containing 1, 2 or 3 nitrogen atoms. When two or more nitrogen atoms are present, these are separated from each other by a hydrocarbyl group having from 2 to 6 carbon atoms, and preferably by an ethylene or propylene group. In preferred alkylene radicals containing one or more nitrogen atoms the nitrogen is part of an amino group. Preferably the amino group is a tertiary amino group. In nitrogen containing polycarboxylic acids (A) all carboxyl groups are linked to carbon atoms, i.e. there is at least one carbon atom between a nitrogen atom and the carboxylic acid group. Accordingly, preferred nitrogen containing radicals Y contain at least 3 carbon atoms, preferably 3 to 12 carbon atoms, more preferably 4 to 10 and especially preferred 4 to 6 carbon atoms, as for example 3 to 10, or 3 to 6, or 4 to 12, carbon atoms. Preferably, Y contains at least 3 carbon atoms per nitrogen atom.

In a further preferred embodiment, Y is an optionally substituted aromatic group having from 6 to 12 carbon atoms. Examples for suited aromatic groups are the benzene nucleus and biphenyl.

In a first preferred embodiment, X is hydrogen. In a second preferred embodiment, X is an alkyl group having from 1 to 12 carbon atoms, more preferred having from 1 to 4 carbon atoms and especially preferred X is a methyl group. In a further preferred embodiment X is a hydroxyl group. X may be bound to any of the carbon atoms of Y, provided the valency of the respective carbon atom does not exceed 4.

In an especially preferred embodiment, the polycarboxylic acid (A) is a saturated or unsaturated aliphatic polycarboxylic acid wherein Y is an alkylene or alkenylene group having 3 or 4 carbon atoms. In a further preferred embodiment, Y is an alkylene radical having from 1 to 10, preferably from 2 to 6, and especially 2, 3 or 4 carbon atoms which is substituted by 1 or 2 hydroxyl groups. In a further especially preferred embodiment, the polycarboxylic acid (A) is a saturated or unsaturated aliphatic polycarboxylic acid wherein Y is an alkylene or alkenylene group having 3 or 4 carbon atoms which is substituted by one or two hydroxyl groups.

Examples for preferred tricarboxylic acids (A) are propane-1,2,3-tricarboxylic acid, aconitic acid, citric acid, isocitric acid, nitrilotriacetic acid, benzene-1,2,3-tricarboxylic acid, benzene-1,3,5-tricarboxylic acid (trimesic acid). Examples for tetracarboxylic acids are butanetetracarboxylic acid, 3-hexyne-1,1,6,6-tetracarboxylic acid, cyclohexane-1,2,4,5-tetracarboxylic acid, and 1,2,4,5-benzenetetracarboxylic acid (pyromellitic acid). Examples for preferred polycarboxylic acids containing one or more nitrogen atoms are nitrilotriacetic acid (NTA), N,N-bis(carboxymethyl) glutamic acid (glutamic acid N,N-diacetic acid; GLDA), aspartic acid N,N-diacetic acid (ASDA), methylglycine N,N-diacetic acid (MGDA), and N-hydroxyethyl ethylenediamine N,N',N'-triacetic acid (HEDTA), ethylenediaminetetraacetic acid (EDTA), diethylenetriamine-pentaacetic acid (DTPA), methylglycine N,N-diacetic acid (MGDA), and N-hydroxyethyl ethylenediamine N,N',N'-triacetic acid (HEDTA). Especially preferred is citric acid.

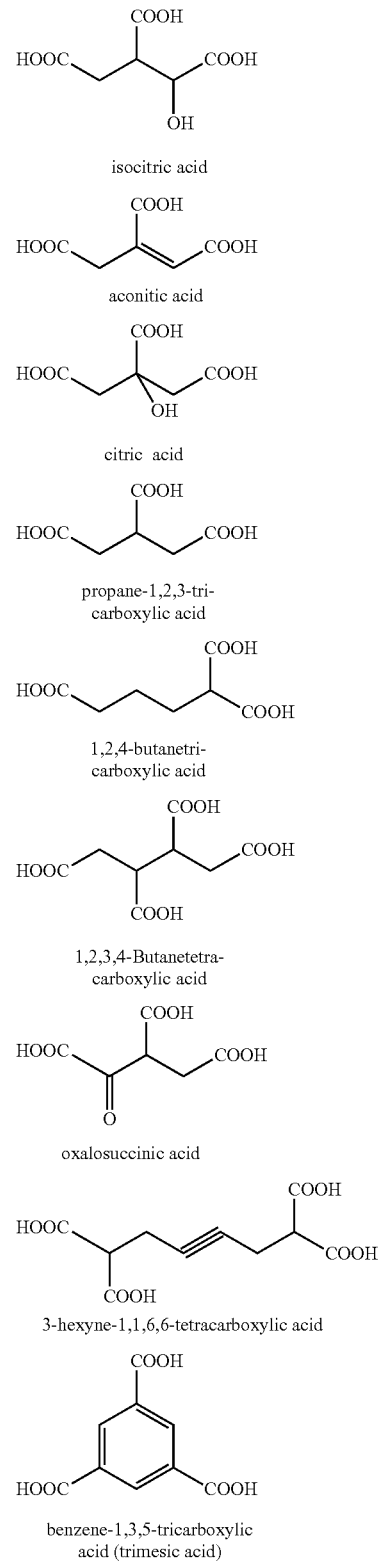

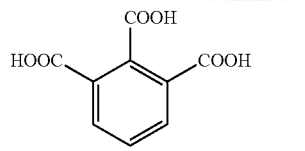

benzene-1,2,3-tri-
carboxylic acid

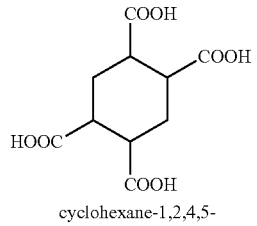

cyclohexane-1,2,4,5-
tetracarboxylic acid

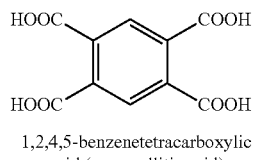

1,2,4,5-benzenetetracarboxylic
acid (pyromellitic acid)

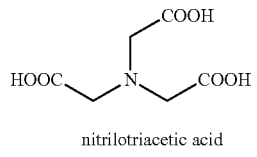

nitrilotriacetic acid

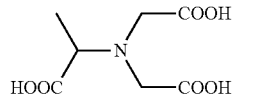

methylglycinediacetic
acid (MGDA)

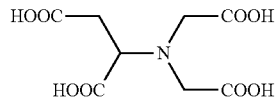

aspartic acid N,N-diacetic
acid (ASDA)

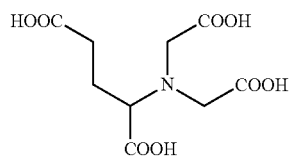

glutamic acid N,N-diacetic
acid (GLDA)

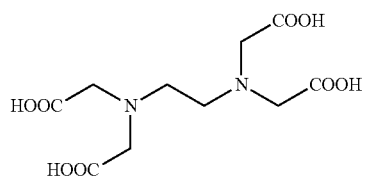

ethylenediamine-
tetraacetic acid (EDTA)

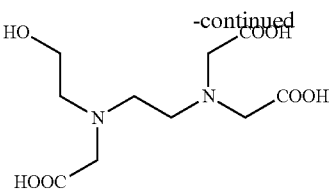

N-hydroxyethyl ethylenediamine
N,N',N'-triacetic acid (HEDTA)

Similarly suited as a component for the production of the branched polyester polyamine (i) are reactive derivatives of the polycarboxylic acids (A). A reactive derivative of the polycarboxylic acid (A) is a derivative that eases the reaction of the polycarboxylic acid (A) with the alkanolamine (C). Preferred as reactive derivatives are acid anhydrides, acid chlorides and/or esters of the polycarboxylic acid (A). Preferred esters are esters of the polycarboxylic acid of formula (A) with a lower alcohol having for example from 1 to 6 and especially preferred from 1 to 4 carbon atoms as for example methanol, ethanol, propanol, iso-propanol and the isomers of butanol.

The monocarboxylic acid (B) has the formula $R^1COOH$ (I), wherein $R^1$ is an alkyl or alkenyl group preferably having from 8 to 24, more preferably from 9 to 20, and especially preferred from 10 to 18 carbon atoms, as for example having from 6 to 24, or from 6 to 20, or from 6 to 18, or from 8 to 20, or from 8 to 20, or from 8 to 18, or from 10 to 28, or from 10 to 24, or from 10 to 18 carbon atoms. $R^1$ may be linear or branched. In a preferred embodiment $R^1$ is linear. $R^1$ may be saturated or unsaturated. In a preferred embodiment, $R^1$ is unsaturated. Preferred unsaturated fatty acids (B) contain 1, 2 or 3 C=C double bonds. In an especially preferred embodiment, the monocarboxylic acid (B) is linear and unsaturated.

Preferred monocarboxylic acids (B) include natural and synthetic fatty acids. Examples of preferred linear monocarboxylic acids of formula (I) are fatty acids like octanoic acid, decanoic acid, undecanoic acid, dodecanoic acid, tridecanoic acid, tetradecanoic acid, hexadecanoic acid, palmitoleic acid, octadecanoic acid, oleic acid, linoleic acid, linolenic acid, eicosanoic acid, docosanoic acid, tetracosanoic acid, gadoleic acid and erucic acid.

Preferred monocarboxylic acids having a branched alkyl residue $R^1$ include fatty acids with one or more methyl branches and especially one or two methyl branches on the carbon chain, as for example iso- and anteiso-methyl-branched fatty acids. While iso-methyl branched fatty acids have the branch point on the penultimate carbon (one from the end or (ω-1)), anteiso-methyl-branched fatty acids have the branch point on the ante-penultimate carbon atom (two from the end or (ω-2)). Preferred monocarboxylic acids having an alkyl residue $R^1$ with a higher degree of branching include those which are can be made for example by the Koch carboxylic acid synthesis by reaction of an olefin with carbon monoxide and hydrogen to form the carboxylic acid. The olefin may be highly branched as for example an oligomer obtained by oligomerization of propene and/or butene. Monocarboxylic acids having a branched alkyl residue $R^1$ may be saturated or unsaturated; preferably they are saturated. Examples for preferred branched fatty acids are 2-ethylhexanoic acid, 13-methyl tetradecanoic acid, 14-methyl pentadecanoic acid, 14-methyl hexadecanoic acid, 15-methyl hexadecanoic acid, 16-methyl heptadecanoic acid and neo-carboxylic acids including neodecanoic acid, neoundecanoic acid and neododecanoic acid also known as versatic acids.

Mixtures containing two or more of the monocarboxylic acids (B) listed above are especially preferred. Preferred mixtures may contain monocarboxylic acids with different chain lengths, with different degrees of unsaturation and/or different degrees of branching. Especially preferred are fatty acid mixtures based on natural fats and oils as for example coco fatty acid, rape seed fatty acid, soya fatty acid, palm fatty acid, palm kernel fatty acid, tallow fatty acid, and tall oil fatty acid. These fatty acid mixtures may be used as such or upon hydrogenation respectively partial hydrogenation. Especially preferred mixtures of fatty acids comprise fatty acids with different degrees of unsaturation, as for example oleic acid, linoleic acid, linolenic acid and their mixtures.

In a preferred embodiment, the iodine value of the monocarboxylic acid (B) and especially of the mixture of monocarboxylic acids (B) is at least 50 g $I_2$/100 g of monocarboxylic acid, preferably from 80 to 150, more preferably from 90 to 140 and especially preferred from 100 to 130 g $I_2$/100 g, as for example from 50 to 150, or from 50 to 140, or from 50 to 130, or from 80 to 140, or from 80 to 130, or from 90 to 150, or from 90 to 130, or from 100 to 150, or from 100 to 140 g $I_2$/100 g. The iodine value can be determined according to the method of Wijs (EN 14111).

In some specific embodiments, the monocarboxylic acid (B) respectively the mixture of monocarboxylic acids (B) may be saturated or at least essentially saturated. Essentially saturated means that the iodine value of the monocarboxylic acid (B) is below 50 g $I_2$/100 g of monocarboxylic acid as for example below 25 g $I_2$/100 g of monocarboxylic acid.

Similarly suited for the manufacture of the polyesters according to the first aspect of the invention are reactive derivatives of the monocarboxylic acid. A reactive derivative of the monocarboxylic acid (B) is a derivative that eases the reaction of the monocarboxylic acid (B) with the alkanolamine (C). Preferred as reactive derivatives are acid anhydrides, acid chlorides and/or esters of the monocarboxylic acid (B). Preferred esters are esters with lower alcohols having 1 to 4 carbon atoms as for example methanol, ethanol, propanol, isopropanol, n-butanol and isobutanol, acid chlorides or acid anhydrides. Preferred monocarboxylic acid derivatives are esters and especially preferred the methyl esters.

Preferably, the molar ratio between the polycarboxylic acid (A) and the monocarboxylic acid (B) is from 1:50 to 2:1, preferably from 1:10 to 1:1, and especially preferred from 1:7 to 1:1.5.

Preferred polyhydroxy compounds used for forming the branched polyester polyamine according to the invention are alkanolamines (C) having the formula (II):

(II)

wherein
$R^2$ is a straight or branched chain alkyl residue having 1 to 18 carbon atoms, an alkenyl residue having 2 to 18 carbon atoms or a polyoxyalkylene residue of the formula —(D-O)$_z$-R$^3$;

$R^3$ is hydrogen, an alkyl group having 1 to 18 carbon atoms or an acyl group having 2 to 18 carbon atoms;
A, B, D independently from each other are a $C_1$ - to $C_4$-alkylene group or a mixture of those; and
x, y, z independently from each other are integers from 1 to 20.

In a first preferred embodiment, $R^2$ is an alkyl residue having 1 to 18 carbon atoms or an alkenyl residue having 2 to 18 carbon atoms. More preferred alkyl residues $R^2$ have from 1 to 12 carbon atoms and especially preferred from 2 to 6 carbon atoms as for example from 1 to 6 carbon atoms, or from 2 to 24 carbon atoms, or from 2 to 18 carbon atoms, or from 2 to 12 carbon atoms. Preferred alkyl residues may be linear or branched. Preferred alkenyl residues $R^2$ have from 3 to 18 carbon atoms and especially preferred from 10 to 18 carbon atoms as for example from 3 to 24 carbon atoms, or from 10 to 18 carbon atoms. Preferred alkenyl residues $R^2$ have 1 or 2 double bonds. Preferred alkenyl residues may be linear or branched. Examples for preferred alkyl and alkenyl residues are methyl, ethyl, propyl, butyl, hexyl, heptyl, octyl, decyl, dodecyl, tetradecyl, hexadecyl octadecyl, octadecenyl and mixtures thereof. Especially preferred is the methyl group.

In a further preferred embodiment, $R^2$ is a polyoxyalkylene residue of the formula —(D-O)$_z$-R$^3$. Preferably, $R^3$ is an alkyl group having from 1 to 12 carbon atoms and especially preferred having from 1 to 6 carbon atoms. In a further preferred embodiment, $R^3$ is an acyl group having from 2 to 12 carbon atoms. Most preferably, $R^3$ is hydrogen.

In the residues —(A-O)$_x$—H, —(B—O)$_y$—H and —(D-O)$_z$—H, if present, the groups A, B and D independently from each other represent an alkylene group having from 2 to 4 carbon atoms or a mixture thereof. More preferably, the alkylene groups A, B and D have two or three carbon atoms and especially preferred they have 2 carbon atoms as for example in the ethylene group of formula —CH$_2$—CH$_2$-.

Preferably, the indices x, y and z, if present, independently from each other are integers from 1 to 10 and more preferably from 2 to 5 as for example from 1 to 5, or from 2 to 20, or from 2 to 10. In a preferred embodiment each of x, y and z, if present, is 1. In a further preferred embodiment, the sum of x+y+z on molar average is a number from 3 to 50, more preferably from 4 to 40 and especially preferred from 5 to 30, as for example a number from 3 to 40, or from 3 to 30, or from 4 to 50, or from 4 to 30, or from 5 to 50, or from 5 to 40.

The alkanolamines (C) can be made for example by reaction of an alkylene oxide with an amine or an alkanolamine. Alkanolamines of formula (II) wherein $R^2$ is an alkyl or alkenyl residue may be synthesized by reaction of an amine of formula $R^2$—NH$_2$ with an alkylene oxide having 2 to 4 carbon atoms. Illustrative examples of suitable amines for use as starting materials for the preparation of alkanolamines and/or their alkoxylates (C) include monoalkylamines. More specific examples of monoalkylamines include, but are not limited to, methylamine, ethylamine, propylamine, 2-ethylhexyl amine, 2-propylheptyl amine, n-octylamine, n-decylamine, n-dodecylamine, coco alkyl amine, n-tetradecyl amine, n-hexadecyl amine, n-octadecyl amine, oleyl amine, tallow alkyl amine, hydrogenated tallow alkyl amine, rape seed alkyl amine, soya alkyl amine, erucyl amine, and any mixture thereof.

Preferred alkylene oxides for the reaction with amines and/or alkanolamines are ethylene oxide, propylene oxide, butylene oxide, and their mixtures. Especially preferred alkylene oxide is ethylene oxide. A, B and D, if present, may be the same or different. If more than one alkylene oxide is reacted with the monoalkylamine or with the alkanolamine, the different alkylene oxides may be added in blocks in any order or they may be added randomly. The alkoxylation may be performed by any suitable method known in the art by using e.g., an alkaline catalyst, such as KOH, or an acid catalyst. In a preferred embodiment A, B and D, if present, are the same. In an especially preferred embodiment, compounds of formula (II), wherein all, or essentially all, of the A-O, B—O and D-O groups, if present, each represent an ethyleneoxy group (—CH$_2$—CH$_2$—O—), are especially preferred.

Examples of preferred di- and trialkanolamines as compounds of formula (II) are N-methyl diethanolamine, N-methyl diisopropanolamine, N-ethyl diethanolamine, N-propyl diethanolamine, N-dodecyl-N,N-bis(2-hydroxyethyl)amine, N-stearyl-N,N-bis(2-hydroxyethyl)amine, N-oleyl-N,N-bis(2-hydroxyethyl)amine, N-cocofatty-N,N-bis(2-hydroxyethyl)amine, N-tallowfatty-N,N-bis(2-hydroxyethyl)amine, polyoxyethylene(5) tallow amine and triethanolamine. Especially preferred is triethanolamine.

Preferably, the molar ratio between the alkanolamine (C) and the sum of the acids (polycarboxylic acid (A) plus monocarboxylic acid (B)) is from 10:1 to 1:5, with molar ratios of 5:1 to 1:2 being especially preferred.

Optionally, the polyester polyamine (i) and/or the polyester quaternary ammonium compound (ii) may further contain minor amounts of a structural element derived from a dicarboxylic acid (D) or a derivative thereof, for example as a chain extender. Suitable dicarboxylic acids (D) and respectively their anhydrides may have one of general formulae (IVa) or (IVb)

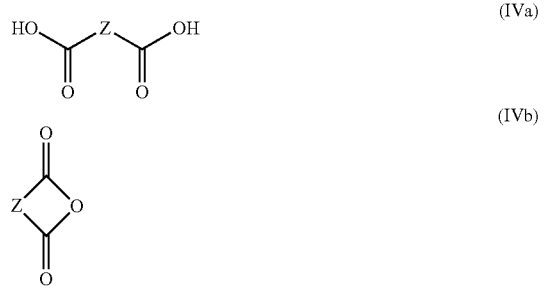

wherein
Z is an optionally substituted aliphatic group having 2 to 15 carbon atoms, an aliphatic aminoalkyl group having 3 to 12 carbon atoms and 1 to 3 nitrogen atoms, or an optionally substituted aromatic group having 6 to 18 carbon atoms.

Illustrative examples of dicarboxylic acids (D) include oxalic acid, malonic acid, succinic acid, glutaric acid, adipic acid, pimelic acid, phthalic acid, tetrahydrophthalic acid, maleic acid, malic acid, tartaric acid, and dimer fatty acids. For the polycondensation reaction the dicarboxylic acids (D) may be used as such. Likewise suited are their derivatives as for example their acid chlorides, their esters with lower alcohols having 1 to 4 carbon atoms as for example methanol, ethanol, propanol, isopropanol, or butanol, as well as their anhydrides. The molar portion of structural units (IVA) and/or (IVB) derived from dicarboxylic acids (D) in the polyester polyamine (i) is preferably from 0 to 25 mol-%, more preferably from 0.5 to 10 mol-%, and especially preferred from 1 to 5 mol-%, for example from 0 to 10 mol-%, or from 0 to 5 mol-%, or from 0.5 to 25 mol %, or from 0.5 to 5 mol-%, or from 1 to 25 mol-%, or from 1 to 10 mol-% based on the sum of the molar contents of structural units derived from (I), (II), (III), (IVA) and (IVB).

The branched polyester polyamine (i) according to the first and second aspect of the present invention can be prepared by a process comprises the steps of mixing compounds of formulae (I), (II), (III) and optionally (IVA) and (IVB) as defined above, and effecting a polycondensation reaction between the compounds in the mixture. Upon quaternization of one or more nitrogen atoms in the polyester polyamine (i) with an alkylating agent the branched polyester quaternary ammonium compound (ii) can be prepared. Such reaction pathway is well known to the ones skilled in the art.

In a first preferred embodiment, preparation of the polyester polyamine (i) may be conducted by polycondensation, comprising the esterification of a reaction mixture containing a polycarboxylic acid (A), a carboxylic acid (B), an alkanolamine (C) and optionally a dicarboxylic acid or its anhydride (D). Esterification reactions are well-known per se in the art. The reactions are preferably performed in the presence of an esterification catalyst, such as a Brønstedt or Lewis acid. Examples for suited catalysts are sulfuric acid, methanesulfonic acid, p-toluenesulfonic acid, hypophosphorous acid, phosphorous acid, citric acid and BF$_3$. Typically, 0.001 to 0.5 wt.-% and preferably 0.005 to 0.15 wt.-% of the catalyst in respect to the mass of the reactants (A), (B), (C) and optionally (D) are used. In a preferred embodiment, the esterification is conducted by heating a mixture of the polycarboxylic acid (A), the carboxylic acid (B), the alkanolamine (C), the esterification catalyst and optionally a dicarboxylic acid (D) to a temperature of from 120 to 240° C. and especially of from 140 to 200° C. The polycondensation reaction is suitably affected by heating the mixture for a period of from 2 to 20 hours. The pressure is preferably between 0.001 and 1.2 bar and more preferred between 0.01 and 1.0 bar. Often a reduced pressure of from 5 to 200 mbar has proven to be advantageous.

Alternatively, other conventional techniques known by the person skilled in the art may be used for the preparation of the polyester polyamine (i), for example starting from a derivative of the polycarboxylic acid (A) and/or the carboxylic acid (B), such as their anhydride, their acid chloride or their ester with an alcohol having 1 to 6 carbon atoms. Accordingly, the polyester polyamine (i) can be made by the reaction of a carboxylic acid derivate (A) as for example an acid anhydride, an acid chloride or a polycarboxylic acid ester with an alcohol having 1 to 6 carbon atoms with the carboxylic acid (B) and the alkanolamine (C). Similarly, a carboxylic acid derivative (B) as for example an acid anhydride, an acid chloride or a carboxylic acid ester with an alcohol having 1 to 6 carbon atoms may be reacted with the polycarboxylic acid (A) and the alkanolamine (C).

When an ester of the carboxylic acid of formula (I) and/or an ester of the polycarboxylic acid of formula (III) is used, the reaction is a transesterification, which is preferably performed in the presence of an alkaline catalyst. For example, the carboxylic acid (I) may be added as e.g., its methyl ester.

In a preferred embodiment, the polycondensation is conducted solvent-free. However, if a solvent is present during the polycondensation, the solvent should be inert to esterification. Suited solvents are aliphatic and/or aromatic solvents and their mixtures like toluene, xylene and commercial solvent mixtures of for example the Solvesso®, Isopar®, Exxsol® Shellsol® grades.

For the preparation of the branched polyester polyamine (i), the portion of carboxylic acid groups stemming from polycarboxylic acids (A) in respect to the whole of carboxylic acid groups stemming from polycarboxylic acids (A) and monocarboxylic acids (B) is preferably from 5 to 80%, more preferably from 10 to 70% and especially preferably from 20 to 65%, as for example from 5 to 70%, or from 5 to 65%, or from 10 to 80%, or from 10 to 65%, or from 25 to 80%, or from 25 to 65%. In the reaction batch the molar quantities of polycarboxylic acid (A) and monocarboxylic acids (B) are adjusted in a way that the preferred portions of carboxylic acid groups stemming from the polycarboxylic acid (A) and monocarboxylic acid (B) given above are present.

Accordingly, in a preferred embodiment the molar ratio between the polycarboxylic acid (A) and the monocarboxylic acid (B) is from 1:50 to 2:1, preferably from 1:10 to 1:1, and especially preferred from 1:7 to 1:1.5, as for example from 1:50 to 1:1, or from 1:50 to 1:1.5, or from 1:10 to 2:1, or from 1:10 to 1:1.5, or from 1:7 to 2:1, or from 1:7 to 1:1.

In a preferred embodiment not all of the hydroxyl groups of the alkanolamine (C) are esterified. This often raises the polyester polyamine's corrosion inhibition capabilities. Preferably, the degree of esterification of the hydroxyl groups stemming from the alkanolamine (C) is less than 95%, more preferably from 20 to 90%, more preferably from 25 to 80% and especially preferred from 30 to 70%, as for example from 20 to 95%, or from 20 to 80%, or from 20 to 70%, or from 25 to 95%, or from 25 to 90%, or from 25 to 70%, or from 30 to 95%, or from 30 to 90%, or from 30 to 80%.

Accordingly, preferred polyesters have a hydroxyl number from 50 to 400 mg KOH/g, more preferably from 75 to 300 mg KOH/g and especially preferred from 100 to 250 mg KOH/g as for example from 50 to 300 mg KOH/g, or from 50 to 250 mg KOH/g, or from 75 to 400 mg KOH/g, or from 75 to 250 mg KOH/g, or from 100 to 400 mg KOH/g, or from 100 to 300 mg KOH/g.

In a further embodiment, the contents of carboxylic acid groups (stemming from polycarboxylic acid (A), monocarboxylic acid (B) and optionally dicarboxylic acid (D)) and hydroxyl groups (stemming essentially from alkanolamine (C)) in the reaction batch are selected in a way that all or at least essentially all carboxylic acid groups are converted into an ester. Accordingly, preferred polyesters have an acid number of 20 mg KOH/g or less, more preferably 10 mg KOH/g or less, and especially preferred 5 mg KOH/g or less.

The limitations for preferred amounts of unreacted functional groups in the polyester polyamine given above resemble the ratios of components fed to the reaction batch, taking into account the functionalities of the respective polycarboxylic acid and the respective alkanolamine.

Preferably, the polymers according to the invention have a weight average molecular weight Mw of from 10,000 g/mol to 500,000 g/mol and more preferably from 20.000 to 250,000 g/mol as determined in 80% 0,1 M NaCl+0.3% trifluoroacetic acid/20% acetonitrile by SEC against poly(vinyl pyrrolidone) standards at 25° C.

Branched polyester quaternary ammonium compounds (ii) may be obtained by conversion of part or all of the tertiary amino groups of the branched polyester polyamine (i) into quaternary ammonium groups by reaction with an alkylating agent. Such quaternization reactions are well-known in the art.

Preferred alkylating agents include alkyl halides, alkyl aryl halides, alkyl sulfates, oxalates, carbonates, epoxides and mixtures thereof. In some embodiments, the quaternizing agent may be a sulfate, such as dimethyl sulfate or diethyl sulfate. In some embodiments, the quaternizing agent may be a halide, such as methyl chloride, methyl bromide, methyl iodide or benzyl chloride. In some embodiments, the quaternizing agent may be a carbonate, such as dimethyl carbonate. In some embodiments, the quaternizing agent may be an epoxide, such as a hydrocarbyl epoxide, such as, for example, ethylene oxide, propylene oxide, butylene oxide, and the like. In some embodiments, the quaternizing agent may be acrylic acid or methacrylic acid. Especially preferred alkylating agents include methyl chloride, methyl bromide, methyl iodide, ethyl chloride, ethyl bromide, ethyl iodide, benzyl chloride, dimethyl sulfate, diethyl sulfate, dimethyl carbonate and any combination thereof. The most preferred quaternization is a methylation or benzylation with methylation being especially preferred.

In a further preferred embodiment, the polyester quaternary ammonium compound (ii) may be produced via an alternative synthesis route wherein the alkanolamine (C) is first quaternized with an alkylating agent as described above and subsequently polycondensed with the polycarboxylic acid (A), the monocarboxylic acid (B) and optionally the dicarboxylic acid (D). In a preferred embodiment, this synthesis route includes as the first reaction step the quaternization of the alkanolamine (C) with an alkylating agent having the formula (V) to give ammonium compound (VI) according to the reaction scheme

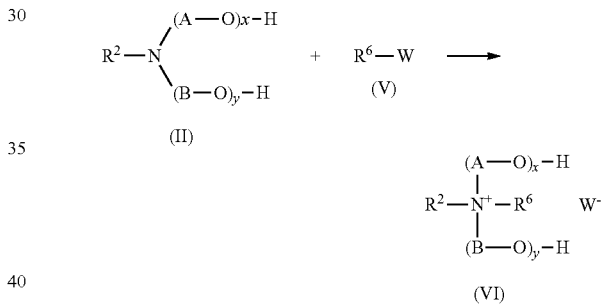

wherein
$R^2$, A, B, x and y have the meanings given above;
$R^6$ is an alkyl residue having from 1 to 5 carbon atoms or an alkyl aryl residue having from 6 to 12 carbon atoms, and
W is a halogen atom or an alkyl sulfate group.

Via both reaction pathways either a part of, or all the nitrogen atoms of the polyester polyamine (i) may be quaternized. Accordingly, the use for corrosion inhibition according to the first aspect of the invention and the method for protecting a metal surface according to the second aspect of the invention include polyester polyamines (i) respectively polyester quaternary ammonium compounds (ii) being partially quaternized. i.e. compounds comprising amine and ammonium groups. In a preferred embodiment, the degree of quaternization of the nitrogen atoms present in partially quaternized polyester quaternary ammonium compounds (ii) is from 1 to 99%, more preferably from 5 to 95% and especially preferred from 10 to 90%, as for example from 1 to 95%, or from 1 to 90%, or from 5 to 99%, or from 5 to 90%, or from 10 to 99% or from 10 to 95%.

In a preferred embodiment, the polyester polyamine (i) respectively the alkanolamine (C) is reacted with the alkylation reagent in a molar ratio—in respect to its nitrogen content—of from 1.0:0.10 to 1.0:1.05 and more preferably from 1.0:0.20 to 1.0:0.98. In an especially preferred embodiment, the polyester polyamine (i) respectively the alkanolamine (C) and the alkylation reagent are reacted in stoichiometric or at least essentially stoichiometric ratio in respect to the nitrogen content of (i) respectively (C).

For the use according to the first aspect of the invention as well as for the method according to the second aspect of the invention polyester polyamines (i) and polyester quaternary ammonium compounds (ii) are similarly suited. However, polyester quaternary ammonium compounds (ii) where at least part of the nitrogen atoms is in the form of quaternary ammonium groups are more preferred. Polyester quaternary ammonium compounds (ii) where all or at least essentially all nitrogen atoms of the polyester are quaternary are especially preferred.

In a preferred embodiment of the invention, the polyester polyamine (i) and/or polyester quaternary ammonium compound (ii) is used for protection of a metal surface from corrosion. (i) and/or (ii) have proven to be especially effective for protecting ferrous metals or alloys, such as iron and steel. In an especially preferred embodiment, (i) and/or (ii) are used for the protection of pipelines, pumps, tanks and other equipment used for example in oil- and gas fields or in refineries against corrosion.

The use aspect as well as the method aspect according to the invention have proven to be especially useful when the metal surface to be protected against corrosion is in contact with a fluid comprising water, for example a mixture of oil and water and especially a mixture of crude oil and water. Both aspects provide protection of metal surfaces being in contact with fluids having varying compositions, e.g., fluids having oil cuts varying from 1 vol.-% in oilfield applications up to nearly 100 vol.-% in e.g., refineries. The different aspects of the invention are similarly advantageous for fluids comprising water with varying contents of dissolved solids and/or salts. For example, the fluid may contain seawater which usually has a salinity of 3.1-3.8% by weight; it may contain produced water which may have a salt content of up to 4 wt.-%, often up to 6 wt.-% and sometimes even more than 6 wt.-%. On the other hand, the water may also be fresh or brackish water with lower salt contents, for example as low as 0.3 wt.-%, even as low as 0.05 wt.-% and down to s0.01 wt.-%; brackish water may exhibit a large variation from time to time having a salt content of about 0.05 wt.-% up to about 3 wt.-%

The use of the polyester polyamine (i) and/or the polyester quaternary ammonium compound (ii) is effective for preventing corrosion in batch treatments as well as in continuous treatments. Surprisingly, they are even highly effective in high shear and in very high shear environments as for example in environments where a shear stress of 10 Pa or more, often a shear stress of 20 Pa or more and sometimes even a shear stress of 50 Pa or more prevails. Furthermore, they are also very effective in high temperature applications for example at temperatures above 120° C. and sometimes even at temperatures above 150° C.

In a preferred embodiment of the invention, the polyester polyamine (i) and/or the polyester quaternary ammonium compound (ii) is added to the fluid before it gets into contact with the metal surface to be protected, for example at any point in a flow line upstream of the part of the line that is intended to be protected. The dosage of polyester polyamine (i) and/or the polyester quaternary ammonium compound (ii) needed to obtain sufficient protection varies with the application. Dosing is preferably in such an amount that the concentration of (i) and/or (ii) in the fluid at the point of protection is from 0.5 to 2,000 ppm (by weight), preferably from 1 to 500 ppm, and most preferably from 2 to 150 ppm, as for example from 0.5 to 500 ppm, or from 0.5 to 150 ppm, or from 1 to 2,000 ppm, or from 1 to 150 ppm, or from 2 to 2,000 ppm, or from 2 to 500 ppm, in respect to the weight of the total fluids. Even though a continuous dosage into fluid streams is preferred, another possible mode is batch treatment, where the preferred dosage is from 1 to 5,000 ppm, more preferably from 2 to 2,000 ppm and especially preferred from 3 to 1,000 ppm, as for example from 1 to 2,000 ppm, or from 1 to 1,000 ppm, or from 2 to 5,000 ppm, or from 2 to 1,000 ppm, or from 3 to 5,000 ppm, or from 3 to 2,000 ppm, in respect to the weight of the total fluids. When a mixture of (i) and (ii) is used, above dosage rates refer to the entirety of (i) and (ii).

It has proven to be advantageous to use the polyester polyamines (i) and/or the polyester quaternary ammonium compounds (ii) for corrosion inhibition according to this invention in a formulation comprising one or more further ingredients in order to e.g., improve handling under different climate conditions and/or to further improve the performance for a specific application. Examples of such ingredients are diluents as well as further actives as for example further corrosion inhibitors being different from (i) and (ii), including amines, imidazolines, pyridines, quinolines, and their derivatives; organic sulfur compounds; organic acids; inorganic acids; organic phosphate esters; fatty acids and their derivatives; as well as dispersing or cleaning surfactants, defoamer additives, neutralizing amines, sulfide inhibitors, $H_2S$ scavengers, paraffin inhibitors, asphaltene inhibitors, hydrate inhibitors, and/or biocides.

In a preferred embodiment, the polyester polyamine (i) and/or the polyester quaternary ammonium compound (ii) is formulated in a diluent for ease of handling and application. Preferred diluents are liquids which at least disperse and preferably dissolve the polyester polyamine (i) and/or the polyester quaternary ammonium compound (ii) in order to reduce its viscosity. Preferred diluents are water and water-miscible organic solvents. In a preferred embodiment, the formulation comprises one or more diluents selected from the group consisting of water, monohydric alkyl alcohols having 1 to 8 carbon atoms, di- and trihydric alcohols having 2 to 6 carbon atoms and $C_1$ to $C_4$ alkyl ethers of said alcohols. More preferably, the diluent is selected from the group consisting of water, methanol, ethanol, isopropanol, butanol, pentanol, 2-ethylhexanol, monoethylene glycol, propylene glycol, diethyleneglycol, triethylene glycol, glycerol, 2-butoxyethanol (BGE), butyl diglycol (BDG), and any mixture thereof. In an especially preferred embodiment, a blend of water with methanol and/or isopropanol is used; in another especially preferred embodiment a blend of water with monoethylene glycol and/or 2-butoxyethanol is used; in yet another especially preferred embodiment, a blend of water, methanol and/or 2-butoxyethanol is used. Especially preferred are diluents and diluent mixtures having a flash point of at least 60° C. and especially preferred having a flash point of at least 75° C. If a diluent is present, such formulation preferably contains from 5 to 95 wt.-%, more preferably from 10 to 90 wt.-%, and especially preferred from 20 to 80 wt.-% of the diluent, as for example from 5 to 90 wt.-%, or from 5 to 80 wt.-%, or from 10 to 95 wt.-%, or from 10 to 80 wt. %, or from 20 to 95 wt.-%, or from 20 to 90 wt.-% of the diluent, based on the weight of the formulation comprising (i), (ii), optionally present further active ingredients and the diluent. Often such formulations allow the polyester polyamine (i) and/or the polyester quaternary ammonium compound (ii) to be delivered in subsea umbilicals.

In a further preferred embodiment, formulations of the polyester polyamine (i) and/or the polyester quaternary ammonium compound (ii) comprise a further corrosion inhibitor being different from (i) and (ii). Examples for preferred further corrosion inhibitors include amines as for example N,N-diisopropylethylamine (EDIPA); alkoxylated amines as for example ethoxylated and/or propoxylated and/or butoxylated amines; fatty amines; fatty amine derivatives as for example amino acids, amino alcohols, amidoamines, ammoniums, quaternary alkyl ammonium compounds; alkyl polyamines; imidazolines and their derivatives and for example their salts, alkyl imidazoline polyethylene amines, imidazoline-amine carboxylates, quaternary alkyl imidazolinium salts or alkoxylated alkyl imidazolines; pyridines and their derivatives, such as, for example, pyridiniums; quinolines and their derivatives, such as, for example, quinoliniums; imidazolines substituted by at least one fatty chain; alkoxylated imidazolines; ester amines; ether amines as for example 3-methoxypropylamine (MOPA); betaines and alkyl betaines; the N-oxide derivatives of the abovementioned amines; fatty acids; oligomeric fatty acids as for example dimer fatty acids; maleated fatty acids; phosphoric acid esters of fatty alcohols; phosphoric acid esters of alkoxylated fatty alcohols, and mixtures of two or more of those.

In a further preferred embodiment, formulations of the polyester polyamine (i) and/or the polyester quaternary ammonium compound (ii) comprise an organic sulfur compound. Often such combinations show a synergistically enhanced performance. A first group of preferred sulfur containing compounds are mercapto and thioether compounds according to formula (VII)

$$R^3\text{-S-}R^4 \quad (VII)$$

wherein
$R^3$ and $R^4$ are independently hydrogen, $C_1$ to $C_{18}$ alkyl, $C_2$ to $C_{18}$ alkenyl or a $C_1$ to $C_{18}$ alkyl aromatic group, and wherein $R^3$ and $R^4$ may contain oxygen or nitrogen atoms, or may be substituted with a carboxylic acid group or an amide group, with the proviso that $R^3$ and $R^4$ are not both hydrogen.

Further groups of preferred sulfur containing compounds are metal or ammonium thiosulfate salts and derivatives of thiourea according to formula (VIII)

$$S=C(NHR^5)(NHR^7) \quad (VIII)$$

wherein
$R^5$ and/or $R^7$ are independently H, $C_1$ to $C_{10}$ alkyl, $C_2$ to $C_{10}$ alkenyl, $C_5$ to $C_9$ aryl groups or mixtures thereof.

Examples for preferred sulfur containing compounds are thioglycolic acid, sodium thiosulfate, ammonium thiosulfite, ammonium thiosulfate, sodium thiosulfate, potassium thiosulfate, potassium thiosulfite, , sodium thiocyanate, ammonium thiocyanate, and calcium thiocyanate, sodium thioglycolate, ammonium thioglycolate, thiourea, and derivatives such as 1,2-diethylthiourea, propylthiourea, 1,2-dibutylthiourea, 1,1-diphenylthiourea, thiocarbanilide, dithiourea thioacetamide, polythioureas, thionicotimide, or thiobenzamide, 2-mercpatoethanol, 3-(methylthio)propanal, cysteamine, 3-chloro-1-propanethiol, 1-mercapto-2-propanol, 2-methoxyethane-thiol, 3-mercapto-1-propanol, 2,3-dimercapto-1-propanol, 1-thio-glycerol, 1,3-propane-dithiol, mercaptosuccinic acid, cysteine, thioacetic acid, N-acetyl-cysteamine, N-carbomoyl-L-cysteine, 4-mercapto-1-butanol, 1,4-butanedithiol, 2,2'-thiodietanethiol, 4-cyano-1-butanethiol, cyclopentanethiol, 1,5-pentanedithiol, 2-methyl-1-butanethiol, 2,3,5,6-tetrafluorobenzenethiophenol, 4-chlorothiophenol, 2-mercaptophenol, thiophenol, cyclohexylthiol, 4-mercaptobenzoic acid, thiosalicylic acid, 2-ethylhexane thiol, sulfonamides, thioethers, thiosemicarbazone derivatives and mixtures thereof. Especially preferred sulfur compounds are sodium thiosulfate, thioglycolic acid; 2-mercaptoethanol, 1,8-Dimercapto-3,6-dioxaoctane, thiourea, and mixtures thereof.

Examples for preferred organic or inorganic acids as further components are acetic acid, citric acid, and hydrochloric acid, in which case non-quaternized amino groups will be predominantly present as salts.

Examples for preferred dispersing or cleaning surfactant are nonionic surfactants as for example ethylene oxide adducts to fatty alcohols, fatty acids, fatty amines, alkyl phenols or fatty acid esters. Further preferred dispersing agents are esters, ethers and amides of carbohydrates with fatty acids respectively fatty alcohols, with partial esters being especially preferred.

Examples for preferred biocides are alkylbenzyldimethyl ammonium chloride, dialkyldimethyl ammonium chloride, tetrakis(hydroxymethyl)phosphonium sulfate (THPS), tetrakis(hydroxymethyl)phosphonium chloride (THPC), alkylamidopropyldimethylamine oxides and quaternary ammonium salts, e.g., alkylbis(hydroxyethyl)methyl quaternary ammonium chloride.

Preferably, each of the further corrosion inhibitors, the organic sulfur compounds, the organic or inorganic acids, the dispersing or cleaning surfactants, the scale inhibitors and/or biocides is combined with the polyester polyamine (i) and/or the polyester quaternary ammonium compound (ii) in a mass ratio of from 1:10 to 10:1.

All preferred embodiments described in the description above and in the claims for the use aspect likewise apply for the method aspect.

EXAMPLES

In order to clearly and demonstrably illustrate the current invention, several examples are presented below, these are however, non-limiting and have been specifically chosen to show those skilled in the art, the logic taken to arrive at the final formulations.

All reagents used were of commercial grade. If not stated otherwise, references to percent values and ppm refer to percent by weight respectively ppm by weight.

The molecular weight averages and molecular weight distributions were determined by SEC (Size Exclusion Chromatography) against poly(vinyl pyrrolidone) standards on a hydrophilic static phase (PSS Novema) in 80% 0.1 M NaCl+0.3% trifluoroacetic acid/20% acetonitrile at 25° C. For detection, the refractive index of the effluent was monitored.

Acid numbers were determined upon dilution of the sample with methanol/2-propanol=1/1 (v/v) solvent by potentiometric titration with tetrabutylammonium hydroxide (TBAH) dissolved in methanol/2-propanol, c=0.1 mol/l up to the equivalence point.

Basic nitrogen content was determined by potentiometric titration in acetic acid with perchloric acid solution in acetic acid, c=0.1 mol/l up to the equivalence point.

Hydroxyl values were determined by acetylation of the sample in pyridine/acetic anhydride=25/1 (v/v) for 1 hour. The excess acetic anhydride was hydrolyzed with water and the resulting acetic acid was titrated with ethanolic potassium hydroxide solution, c=0.5 mol/l up to the equivalence point.

Iodine values were determined according to the method of Wijs (EN 14111).

The dry matter content of the reaction products was determined by drying the polymer solutions on an infrared balance until constant weight, whereby the dry matter content is the part of the tested solution in percent per weight which remains in the drying dish.

Example 1

590 g (2.1 mol) distilled mixed fatty acid comprising as main components 12 wt.-% $C_{16}$, and 80 wt.-% $C_{18}$ fatty acids and having an iodine value of 105 g $I_2$/100 g and 230 g (1.2 mol) citric acid were charged into a round-bottom flask fitted with a condenser, a thermometer, a heating mantle, a nitrogen inlet, and a stirrer. The mixture was heated to 120° C. under stirring. 447 g (3.0 mol) triethanolamine were added continuously with the temperature not exceeding 130° C. Subsequently the batch was slowly heated to 180° C. while distilling off the water formed during the reaction. After 10 hours the acid number had decreased to 5 mg KOH/g and the reaction was stopped. The obtained solvent-free polyester reaction product (sample 1A) was a viscous liquid and had a hydroxyl value of 168 mg KOH/g, a mean weight average molecular weight Mw of 72.280 g/mol and a polydispersity of 2.8.

For subsequent quaternization the above polyester was dissolved in 610 g 2-butoxyethanol. Within 1 hour 357 g (2.83 mol) dimethyl sulfate was added with the temperature not exceeding 65° C. After all dimethyl sulfate was added the batch was stirred at 65° C. for another 2.5 h. The reaction was stopped after the content of basic nitrogen remained constant for more than 20 minutes and no residual dimethyl sulfate was analyzed. The reaction product (sample 1B) had a dry matter content of 68.6 wt.-%.

Example 2

67.7 g (0.33 mol) distilled mixed fatty acid comprising 72 wt.-% $C_{12}$ and 24 wt.-% $C_{14}$ fatty acids as main components and having an iodine value of 0.2 g $I_2$/100 g and 30 g (0.15 mol) citric acid were charged into a round-bottom flask fitted with a condenser, a thermometer, a heating mantle, a nitrogen inlet, and a stirrer. The mixture was heated to 120° C. under stirring. 70.1 g (0.47 mol) triethanolamine were added continuously with the temperature not exceeding 130° C. Subsequently the batch was slowly heated to 180° C. while distilling off the water formed during the reaction. After 6 hours the acid number had decreased to 5 mg KOH/g and the reaction was stopped. The obtained solvent-free polyester reaction product (sample 2A) was a viscous liquid.

For subsequent quaternization 101,85 g of the above polyester was dissolved in 36 g 2-butoxyethanol. Within 1 hour 29.5 mL (0.31 mol) dimethyl sulfate was added with the temperature not exceeding 65° C. After all dimethyl sulfate was added the batch was stirred at 75° C. for another 3.5 h. The reaction was stopped after the content of basic nitrogen remained constant for more than 20 minutes and no residual dimethyl sulfate was analyzed. The reaction product (sample 2B) had a dry matter content of 79.5 wt.-%.

Example 3

164.8 g (0.59 mol) of the distilled mixed $C_{16/18}$ fatty acids described in example 1 and 49.5 g (0.21 mol) butane tetracarboxylic acid were charged into a round-bottom flask fitted with a condenser, a thermometer, a heating mantle, a nitrogen inlet, and a stirrer. The mixture was heated to 120° C. under stirring. 153.4 g (1.26 mol) N-methyldiethanolamine were added continuously with the temperature not exceeding 130° C. Subsequently the batch was slowly heated to 180° C. while distilling off the water formed during the reaction. After 6 hours methane sulfonic acid (0.002 mol) was added and the reaction mixture was stirred for additional 18 hours at 180° C. The acid number had decreased to 4 mg KOH/g and the reaction was stopped. The obtained solvent-free polyester reaction product (sample 3A) was a viscous liquid.

For subsequent quaternization 95.6 g of the above polyester was dissolved in 33 g iso-propanol. Within 1 hour 28.1 mL (0.3 mol) dimethyl sulfate was added with the temperature not exceeding 65° C. After all dimethyl sulfate was added the batch was stirred at 75° C. for another 5 h. The reaction was stopped after the content of basic nitrogen remained constant for more than 20 minutes and no residual dimethyl sulfate was analyzed. The reaction product (sample 3B) had a dry matter content of 79.1 wt.-%.

Example 4

148.3 g (0.53 mol) distilled mixed fatty acid comprising mainly $C_{16}$-$C_{20}$ fatty acids including unsaturated components and 48.5 g (0.25 mol) nitrilotriacetic acid were charged into a round-bottom flask fitted with a condenser, a thermometer, a heating mantle, a nitrogen inlet, and a stirrer. The mixture was heated to 120° C. under stirring. 138.2 g (1.14 mol)N-methyldiethanolamine were added continuously with the temperature not exceeding 130° C. Subsequently the batch was slowly heated to 180° C. while distilling off the water formed during the reaction. After 9 hours methane sulfonic acid (0.002 mol) was added and the reaction mixture was stirred for additional 19.5 hours at 180° C. The acid number had decreased to 25 mg KOH/g and the reaction was stopped. The obtained solvent-free polyester reaction product (sample 4A) was a viscous liquid.

For subsequent quaternization 96.5 g of the above polyester was dissolved in 34 g 2-butoxyethanol. Within 1 hour 29.9 mL (0.32 mol) dimethyl sulfate was added with the temperature not exceeding 65° C. After all dimethyl sulfate was added the batch was stirred at 75° C. for another 7.5 h. The reaction was stopped after the content of basic nitrogen remained constant for more than 20 minutes and no residual dimethyl sulfate was analyzed. The reaction product (sample 4B) had a dry matter content of 78.8 wt.-%.

Example 5 (Comparative According to WO 2012/028542)

230 g tallow fatty acid (0.82 mol), 195 g methyl diethanolamine (1.64 mol) and 180 g adipic acid (1.23 mol) were added to a round-bottomed flask fitted with a condenser, a thermometer, a heating mantle, a nitrogen inlet, and a mechanical stirrer. The reaction mixture was slowly heated to 170° C. Commencing at 150° C., the water produced during the reaction started to distil off. After 3.5 h, vacuum was applied gradually in order to more completely remove the water. After 4 h, the endpoint vacuum of 16 mbar was reached. The progress of the reaction was monitored by titration for acid value. After 7 h at 174° C. under vacuum the reaction was stopped. The acid value of the obtained solvent-free product (comparative sample 5A) was 10.3 mg KOH/g.

For quaternization, 240.2 g polyester from example 5 were dissolved in 43.5 g 2-butoxyethanol and heated to 57°

C. in a stirred autoclave. Methylchloride (36.6 g) was added over 90 minutes. Post-reaction was then carried out for 10 hours at 93±3° C. 252 g of the final product (comparative sample 5B) were obtained as a paste containing 13.6% (w/w) of 2-butoxyethanol. $^1$H-NMR spectroscopy showed that no non-quatemised amine was left.

For comparison purposes, N-tallow alkyl hexahydropyrimidinium ethoxylate methosulfate (sample 6) was tested as well. This monomeric quat is a corrosion inhibitor which has proven to be especially efficient for corrosion inhibition in sour environments.

Corrosion Testing

In order to evaluate the corrosion inhibition efficacy of the polyesters according to the invention, 4 different test methods were employed: Linear Polarizing Resistance (LPR), Rotating Cylinder Electrode Test (RCE), Shell wheel test and High Pressure/High Temperature Rotating Cage Autoclave Test (RCA). For all testing 3.5% NaCl brine was used. For the application tests the materials to be tested (inventive as well as comparative) were diluted with butyl glycol to an active content of 25 wt.-% prior to testing. The dosage rates given in the tables refer to these 25 wt.-% active formulations.

Linear polarization resistance (LPR) measurements were made with a Gamry electrochemical measurement system. The working electrode was made of a 1018 carbon steel (CS) cylinder with a surface area of 3.16 cm$^2$. A Hastelloy C276 electrode was used as a pseudoreference, and a titanium rod was used as the counter electrode. The corrosion inhibitors were added based on the brine volume after the baseline corrosion rate was monitored for approximately 1.5 hours. From the polarization resistance measured in certain time intervals, the corrosion rate was determined according to the Stern-Geary equation. The % protection was calculated from the following equation:

$$\% \text{ protection} = (1 - (x/y)) * 100$$

wherein x = corrosion rate in the presence of corrosion inhibitor (mm/year); and y = corrosion rate in the absence of corrosion inhibitor (mm/year).

The test results are given in Table 1.

TABLE 1

Results of LPR testing

| Test No. | Sample | ppm | Corrosion Protection [%] | | | | | |
|---|---|---|---|---|---|---|---|---|
| | | | 0.5 h | 1 h | 3 h | 5 h | 7 h | 9 h |
| 1 | 1A | 50 | 66 | 81 | 3 | 94 | 95 | 93 |
| 2 | 1B | 50 | 77 | 84 | 90 | 88 | 91 | 95 |
| 3 | 2A | 50 | 60 | 66 | 78 | 84 | 91 | 92 |
| 4 | 2B | 50 | 74 | 79 | 85 | 87 | 92 | 92 |
| 5 | 3A | 50 | 73 | 78 | 86 | 90 | 92 | 93 |
| 6 | 3B | 50 | 62 | 77 | 94 | 95 | 96 | 97 |
| 7 | 4A | 50 | 70 | 74 | 89 | 94 | 94 | 95 |
| 8 | 4B | 50 | 72 | 76 | 91 | 93 | 94 | 96 |
| 9 | 5A | 50 | 53 | 55 | 58 | 60 | 62 | 65 |
| 10 | 5B (comp.) | 50 | 62 | 61 | 61 | 67 | 70 | 73 |
| 11 | 99 wt.-% 3B + 1 wt.-% 2-mercaptoethanol | 50 | 95 | 97 | 99 | 99 | 99 | 99 |

Corrosion Testing in the Rotating Cylinder Electrode Test (RCE)

RCE tests were conducted in Pyrex glass reaction kettles. In the sweet system evaluations they were continuously purged with CO$_2$ at 65° C. and for the sour system testing they were continuously purged at 65° C. with a 200 ppm H$_2$S, 20% CO$_2$ blend with the balance made up of N$_2$. The corrosion inhibitor evaluation testing solution consisted of 900 mL of 3.5% NaCl brine for the sweet systems and a 90/10 percent brine/petroleum mixture for sour systems. The brine was deaerated for three hours, with respect to the system gases, in the reaction kettles prior to inserting the working electrodes to achieve an anaerobic condition. A magnetic stir bar and hot plate combination was used to agitate the solution during the initial deaeration period. The electrode rotation rate was set at 4,000 RPM, which generated a wall shear stress of 22 Pa. Flow meters were used to ensure the gas flow rates were identical between the reaction kettles.

Corrosion rates were determined by LPR methodology as described above. The test was allowed to run for sixteen hours. Test results are given in tables 2 and 3.

TABLE 2

Results of sweet RCE testing

| Test No. | Sample | ppm | Corrosion Protection [%] | |
|---|---|---|---|---|
| | | | after 2 h | after 16 h |
| 12 | 1B | 15 | 95.9 | 98.4 |
| 13 | 5B (comp.) | 15 | 94.1 | 97.2 |

TABLE 3

Results of sour RCE testing

| Test No. | Sample | ppm | Corrosion Protection [%] | |
|---|---|---|---|---|
| | | | after 2 h | after 16 h |
| 14 | 1B | 15 | 97.7 | 97.7 |
| 15 | 5B (comp.) | 15 | 97.1 | 97.3 |

Corrosion testing in the Shell Wheel Test

In the Shell wheel test, carbon steel coupons (DIN 1.1203 with surface area 15 cm$^2$) were immersed into a saltwater/petroleum mixture (9:1) previously degassed with CO$_2$ for one hour with the saltwater being a 5% NaCl solution adjusted to pH 3.5 with acetic acid) and exposed to this medium at a peripheral speed of 40 rpm at 600 C for 24 hours. The mass loss in presence of 50 ppm of the formulated corrosion inhibitors was compared to the loss in absence of the inhibitor (blank). Test results are given in table 4.

TABLE 4

Results of wheel testing

| Test No. | Sample | mass loss [mg] | | Protection [%] |
|---|---|---|---|---|
| | | blank | inhibited | |
| 16 | 1A | 34.5 | 4.8 | 86 |
| 17 | 1B | 33.3 | 7.2 | 78 |
| 18 | 2A | 34.5 | 3.6 | 90 |
| 19 | 2B | 34.8 | 7.9 | 77 |
| 20 | 3A | 34.5 | 8.2 | 76 |
| 21 | 3B | 37.0 | 4.4 | 88 |
| 22 | 4A | 34.5 | 4.4 | 87 |
| 23 | 4B | 37.0 | 7.3 | 80 |
| 24 (comp.) | 5A | 33.3 | 13.7 | 59 |
| 25 (comp.) | 5B | 34.8 | 16.8 | 52 |

Above test results demonstrate that the polymeric inhibitor samples 1A, 1B, 2A, 2B, 3A, 3B, 4A and 4B according to different embodiments of the invention give an excellent corrosion protection under representative test conditions also at quite low dose levels. The corrosion protection is well improved over the comparative linear polymers based on a dicarboxylic acid (samples 5A, 5B). Presumably, this is due to an improved transfer of the polymers to the aqueous phase.

Corrosion Testing in the Rotating Cage Autoclave Test (RCA)

Autoclaves equipped with rotating cages (RCA) were used to simulate high shear conditions for the purpose of evaluating system corrosivity and inhibitor performance. The testing solution consisted of 720 mL 3.5% NaCl brine and 80 mL LVT-200 oil. The synthetic brine had three cycles of vacuum/$CO_2$ charge to the vessel prior to initiating the test to remove dissolved oxygen and to achieve an anaerobic system. Two weight loss corrosion coupons fixed on the rotating cage were used in each autoclave. General corrosion rates were calculated by weight loss measurement. A blank was run for comparison. Test conditions have been summarized below in Table 5. Test results obtained with polyesters as single active component are shown in tables 6 and 8.

Table 7 gives a comparison of the performance of polyester 1B according to the invention with polyester 5B according to the state of the art in a formulated corrosion inhibitor package.

TABLE 5

Conditions for RCA Corrosion Testing:

| | |
|---|---|
| Temperature | 65° C. |
| Gas Composition, sweet | 15% $CO_2$; balance $N_2$ |
| Gas Composition, sour | 200 ppm $H_2S$, 15% $CO_2$; balance $N_2$ |
| Pressure | 70 bar |
| Brine Composition | Synthetic brine (3.5% NaCl) |
| Test Duration | 72 hours |
| Stir Rate | 1700 rpm |

TABLE 6

Results of sweet RCA testing

| Test No. | Sample | ppm | Average corrosion rate [mpy] | Percent protection |
|---|---|---|---|---|
| 26 | blank | — | 193.8 | — |
| 27 | 1B | 150 | 105.7 | 45.5 |
| 28 | 5B (comp.) | 150 | 125.7 | 38.9 |

TABLE 7

Results of sweet RCA testing of samples 1B and 5B in combination with further corrosion inhibitors

| Test No. | Sample | ppm* | Average corrosion rate [mpy] | Percent protection |
|---|---|---|---|---|
| 29 | blank | — | 60.1 | — |
| 30 | 1B | 150 | 6.4 | 89.6 |
| 31 | 5B (comp.) | 150 | 18.0 | 70.0 |

*The additives used in tests 30 and 31 contained, besides the polymeric corrosion inhibitor 1B respectively 5B, a mixture comprising a mixture of oligomeric fatty acids, ethoxylated alkyl imidazoline, phosphoric acid ester, and thioglycolic acid. The tests were conducted by replacing 5B in the formulation with 1B to compare the performance of the two chemicals in an otherwise identical formulation.

TABLE 8

Results of sour RCA testing

| Test No. | Sample | ppm | Average corrosion rate [mpy] | Percent protection |
|---|---|---|---|---|
| 32 | blank | — | 124.4 | — |
| 33 | 1B | 150 | 4.1 | 96.7 |
| 34 | 6 (comp.) | 150 | 8.99 | 92.8 |

Biodegradability and acute toxicity of a branched polyester polyamine have been compared with a comparative linear polyester polyamine. Biodegradability was tested in seawater using the OECD 306 closed bottle test at a test concentration of 2.00 mg/l. The acute toxicity was tested according to the OECD 203 Fish Acute Toxicity Test (992) over a 96-hour exposure period. The test specimens were Sheepshead Minnow (*Cyprinodon variegatus*).

TABLE 9

Biodegradability according to OECD 306

| Test | inhibitor | biodegradability |
|---|---|---|
| 35 | sample 1B | 75% (28 days) |
| 36 (comp.) | sample 5B | 62% (28 days) |

TABLE 4

Fish Acute Toxicity according to OECD 203 Test

| Test | inhibitor | $LC_{50}$ value |
|---|---|---|
| 37 | sample 1B | <10 ppm (96 hours) |
| 38 (comp.) | sample 5B | >14.6 ppm (96 hours) |

The invention claimed is:

1. A method for protecting a metal pipeline, pump, or tank surface from corrosion, the method comprising a step of bringing the metal pipeline, pump, or tank surface into contact with an effective amount of a branched polyester quaternary ammonium compound (ii) obtainable by quaternization of a branched polyester polyamine (i) formed by the reaction of
   (A) a polycarboxylic acid having 3 or 4 carboxylic acid groups, or a reactive derivative thereof, with
   (B) a monocarboxylic acid having the formula (I)

$$R^1COOH \tag{I}$$

wherein $R^1$ is an alkyl or alkenyl group having from 6 to 28 carbon atoms, or a reactive derivative thereof, and
   (C) an alkanolamine having the formula (II)

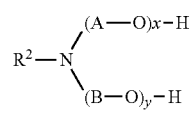

$$R^2-N\begin{matrix}(A-O)x-H \\ (B-O)y-H\end{matrix} \tag{II}$$

wherein
   $R^2$ is a straight or branched chain alkyl residue having from 1 to 24 carbon atoms, an alkenyl residue having from 2 to 24 carbon atoms, or a polyoxyalkylene residue of the formula $-(D-O)_z-R^3$;
   $R^3$ is hydrogen, an alkyl group having 1 to 18 carbon atoms, or an acyl group having 2 to 18 carbon atoms;

A, B, D independently from each other are a $C_2$- to $C_4$-alkylene group or a mixture of those;

x, y, z independently from each other, are integers from 1 to 2; and wherein the branched polyester polyamine (i) formed by the reaction of (A), (B), (C) and optionally (D) is reacted with a quaternizing agent to produce the branched polyester quaternary ammonium compound (ii).

2. The method according to claim 1, wherein the quaternizing agent is an alkylating agent.

3. The method according to claim 1, wherein from 1 to 99% of the nitrogen atoms present in the branched polyester quaternary ammonium compound (ii) are quaternized.

4. The method according to claim 1, wherein (A) is a polycarboxylic acid having 3 or 4 carboxylic acid groups and is of the formula (III)

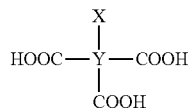

(III)

wherein

Y is an optionally substituted aliphatic group having from 2 to 15 carbon atoms, an aliphatic aminoalkylene group having from 3 to 12 carbon atoms and from 1 to 3 nitrogen atoms, or an optionally substituted aromatic group having from 6 to 18 carbon atoms; and X is hydrogen, a $C_1$- to $C_{20}$-alkyl group, a carboxylic acid group or a carboxylic acid derivative, a keto group, —OH, or —OR$^4$, wherein R$^4$ is a $C_1$-$C_4$ alkyl group.

5. The method according to claim 4, wherein Y is either an alkylene or alkenylene radical having from 2 to 10 carbon atoms or an alkylene radical containing one or more nitrogen atoms.

6. The method according to claim 5, wherein Y is an alkylene radical containing one or more nitrogen atoms and at least one nitrogen atom is part of an amino group.

7. The method according to claim 4, wherein Y is substituted by one or two hydroxyl groups.

8. The method according to claim 1, wherein R$^1$ is unsaturated.

9. The method according to claim 1, wherein (A) comprises an acid anhydride, an acid chloride, an ester, or a combination of these.

10. The method according to claim 1, wherein (B) comprises either a mixture of fatty acids with different degrees of unsaturation; or an essentially saturated fatty acid, wherein the mixture of fatty acids or the essentially saturated fatty acid has an iodine value, determined according to the method of Wijs, of at least 50 g $I_2$/100 g.

11. The method according to claim 1, wherein (B) comprises an acid anhydride, an acid chloride, an ester, or a combination of these.

12. The method according to claim 1, wherein the molar ratio between (A) and (B) is from 1:50 to 2:1.

13. The method according to claim 1, wherein R$^2$ is an alkyl residue having 1 to 18 carbon atoms or an alkenyl residue having from 2 to 18 carbon atoms.

14. The method according to claim 1, wherein the molar ratio between (C) and the total molar amount of (A) plus (B) is from 10:1 to 1:5.

15. The method according to claim 1, wherein the polyester quaternary ammonium compound (ii) further contains a minor amount of a structural element derived from a dicarboxylic acid or a derivative thereof.

16. The method according to claim 15, wherein the polyester quaternary ammonium compound (ii) further contains a minor amount of a structural element derived from a compound of either formula (IVa) or formula (IVb)

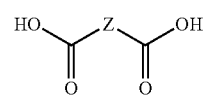

(IVa)

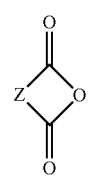

(IVb)

wherein Z is an optionally substituted aliphatic group having from 2 to 15 carbon atoms, an aliphatic aminoalkyl group having 3 to 12 carbon atoms and 1 to 3 nitrogen atoms, or an optionally substituted aromatic group having from 6 to 18 carbon atoms.

17. The method according to claim 1, wherein the branched polyester quaternary ammonium compound (ii) is added to a fluid that is in contact with the metal pipeline, pump, or tank surface, wherein the fluid comprises water and the concentration of (ii) in the fluid is from 1 to 2,000 ppm (by weight).

18. The method according to claim 1, wherein the polyester quaternary ammonium compound (ii) is part of a formulation comprising a diluent.

19. The method according to claim 18, wherein the diluent is water or a water miscible organic solvent.

20. The method according to claim 1, wherein the polyester quaternary ammonium compound (ii) is part of a formulation comprising one or more further ingredients selected from further corrosion inhibitors being different from (i) and (ii); dispersing or cleaning surfactants; defoamer additives; neutralizing amines; sulfide inhibitors; $H_2S$ scavengers; paraffin inhibitors; asphaltene inhibitors; hydrate inhibitors; and biocides, wherein the further corrosion inhibitors being different from (i) and (ii) are selected from the group consisting of organic sulfur compounds; organic phosphate esters; organic acids; inorganic acids; amines; imidazolines; pyridines; quinolines; and fatty acids and derivatives thereof.

* * * * *